United States Patent
Ivashin et al.

(10) Patent No.: US 7,176,957 B2
(45) Date of Patent: Feb. 13, 2007

(54) LOCAL VIDEO LOOPBACK METHOD FOR A MULTI-PARTICIPANT CONFERENCE SYSTEM USING A BACK-CHANNEL VIDEO INTERFACE

(75) Inventors: Victor Ivashin, Danville, CA (US); Sean Miceli, Sunnyvale, CA (US); Ronald Boskovic, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 71 days.

(21) Appl. No.: 10/853,698

(22) Filed: May 25, 2004

(65) Prior Publication Data

US 2005/0264648 A1  Dec. 1, 2005

(51) Int. Cl.
*H04N 7/14* (2006.01)

(52) U.S. Cl. .............. 348/14.09; 348/14.08; 348/14.07

(58) Field of Classification Search .. 348/14.01–14.09, 348/14.11, 14.12, 14.13; 709/204; 370/260, 370/261, 262; 715/753, 751, 755
See application file for complete search history.

(56) References Cited

U.S. PATENT DOCUMENTS

| | | | |
|---|---|---|---|
| 5,835,129 A * | 11/1998 | Kumar | 348/14.09 |
| 5,963,246 A * | 10/1999 | Kato | 348/14.09 |
| 6,243,129 B1 | 6/2001 | Deierling | |
| 6,285,661 B1 * | 9/2001 | Zhu et al. | 370/260 |
| 6,288,739 B1 | 9/2001 | Hales et al. | |
| 6,292,225 B1 | 9/2001 | Champion et al. | |
| 6,313,822 B1 | 11/2001 | McKay et al. | |
| 6,356,294 B1 * | 3/2002 | Martin et al. | 348/14.07 |
| 6,356,313 B1 | 3/2002 | Champion et al. | |
| 6,377,282 B1 | 4/2002 | Champion | |
| 6,384,862 B1 | 5/2002 | Brusewitz et al. | |
| 6,519,662 B2 | 2/2003 | Clapp et al. | |
| 6,590,604 B1 * | 7/2003 | Tucker et al. | 348/14.13 |
| 6,831,675 B2 * | 12/2004 | Shachar et al. | 348/14.08 |
| 2002/0080280 A1 | 6/2002 | Champion et al. | |

* cited by examiner

*Primary Examiner*—Melur Ramakrishnaiah (57) ABSTRACT

A multi-participant videoconference system incorporating a back-channel connection and a client video mixer is disclosed. The multi-participant videoconference system includes a client component and a server component. The server component provides a composite conference video signal to the client component. A region is defined in the composite conference video signal and the size and coordinates of the region are communicated to the client component by the server component over the back-channel. The client component captures local video and mixes local video into the composite conference video signal using the size and coordinates received from the server component for display.

21 Claims, 7 Drawing Sheets

LOCAL VIDEO LOOPBACK METHOD FOR A MULTI-PARTICIPANT CONFERENCE SYSTEM USING A BACK-CHANNEL VIDEO INTERFACE

BACKGROUND OF THE INVENTION

1. Field of the Invention

The present invention relates generally to multi-participant conferencing systems, and more particularly to utilization of local video in an integrated multi-participant conferencing system having a back-channel connection.

2. Description of the Related Art

Conferencing systems generally define the ways in which a set of participants may collaborate. The structures of conferencing systems typically establish the rules for information exchange. Methods of communication are identified and defined, and accessible media is identified within the conferencing system structure. Some systems may allow for communication with remote or mobile participants, while others limit access to dedicated locations or members. Features such as grouping participants into logical meeting spaces, assigning security access rights to a collaboration, specializing in particular types of media communication, and so forth, are all elements of various conferencing systems.

Participants in a videoconference typically receive media from several contributing sources in a collaborative exchange. Such media includes, but is not limited to, video, audio, slide shows, etc., and can be offered by either or both the individual participants in the video conference as well as the conferencing system itself. Looking at just the video portion of the media, participants, whether or not the participant contributes media to the conferencing system, typically receive a single video signal representing a view of the conference.

Depending on the conferencing system used, the conference view displayed to each participant may be divided into regions according to a video layout or presentation chosen by the individual participant or by the conferencing system. Each region displayed may represent participants in the conference, or a single region representing a primary speaker may be selected or defined, or any number of variations of video presentation according to the level of sophistication or complexity of the particular conferencing system and according to preferences of conference participants.

It is often advantageous for a contributing participant in a videoconference to have a view or display of the video that the contributing participant is providing to the collaboration. Such a view or display provides feedback to the contributing participant, allowing the contributing participant to ensure that what is being provided is accurate, desirable, and is conveying the message or view intended (i.e., the subject is in frame, the subject has correct focus and exposure, etc.) In the typical conferencing system, the contributing participant's own video is simply another media in the conference. Consequently, a region in a video presentation or layout may be identified to contain the view of the contributing participant's own video. The result is that the contributing participant sees him or herself in one of the defined regions of the video presentation or layout.

Typically, all video in the videoconference, including the "self video" described above, is sent from a participant using a conference client of the conferencing system to a media mixer of the conferencing system. The conferencing system then returns a video signal according to the participants' selections, including, if selected, the contributing participant's self video. As with many communication systems, the process as described introduces latency through transmission delays and processing time. Additionally, video quality can be diminished as the video signal may be operated on by encoders, decoders, mixers, processors, etc., and is affected by transmission limitations including bandwidth or signal loss. The resulting self video, therefore, is typically degraded, distracting, and generally undesirable.

Some prior art approaches to achieving acceptable self or local video include the providing of local video through a separate loopback technique. In this approach, video from a local camera device is both forwarded to the conferencing system for mixing with all other video, and is displayed directly on the conference client to the contributing participant. Common techniques for the local presentation include display of a separate video window, display in the video presentation or layout as a Picture-In Picture over or within the system video presentation or layout, and the use of a separate local video display. While such techniques benefit the contributing participant by enabling essentially real-time video display, drawbacks include possibly needing more display area, increased window management, more equipment may be required, and the need to monitor more than one display.

In view of the foregoing, what is needed is a videoconferencing system that implements a local video loopback method providing useful video presentation or layout and region interfaces, enhancing the videoconference environment, and that is easily implemented.

SUMMARY OF THE INVENTION

Broadly speaking, the present invention fills these needs by providing a multi-participant videoconferencing system having a back-channel communication link and a client video mixer to integrate local video into a server-provided composite conference video feed. The present invention can be implemented in numerous ways, including as a process, an apparatus, a system, a device, a method, or a computer readable media. Several embodiments of the present invention are described below.

In one embodiment, a multi-participant videoconference system is provided. The multi-participant videoconference system includes a client component. The client component includes a conference client enabled to execute peer-to-peer videoconferencing software. The conference client communicates video and audio data across a conference channel. The client component further includes a client monitor configured to monitor the conference client, and a back-channel connection. The back-channel connection is a parallel communication link to the conference channel between the client component and a server component. The client component also includes a client video mixer. The multi-participant videoconference system further includes a server component. The server component provides a client configurable audio/video stream to each of a plurality of participants in the multi-participant video conference system.

In another embodiment, a method for defining a region for local video within a composite video layout of a multi-participant videoconference system is provided. The method includes defining a composite conference video layout. The composite conference video layout has up to a plurality of regions. The method also includes identifying a region in the defined composite conference video layout for a local video display. The method then provides for communicating a size and a location of the identified region to a client component of the multi-participant videoconference system, and for transmitting a composite conference video signal to the client component. The composite conference video signal includes the identified region for the local video display.

In a further embodiment, multi-participant video conference system is provided. The multi-participant videoconference system includes a server component having a media mixer, and a client component having a client video mixer. The client video mixer is capable of inserting real-time video content into a conference composite video signal within a specified region defined by the server component.

In yet another embodiment, a method for improving an image quality of a composite conference video in a multi-participant videoconference system is provided. The method includes defining a layout for up to a plurality of video images. The layout defines a composite of the up to a plurality of video images. A region of the layout is identified. The identified region is to be replaced by another video signal. The method further provides for composing a composite conference video signal. The composite conference video signal is configured to communicate the composite conference video in the defined layout. The composite conference video signal includes the identified region. The method then includes transmitting the composite conference video signal from a server component to a client component of the multi-participant videoconference system. The identified region of the composite conference video minimizes processing of one of the up to a plurality of video images in the composite conference video signal.

The advantages of the present invention over the prior art are numerous and will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for a local video loopback method in a multi-participant videoconferencing system is described. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Embodiments of the present invention provide a method and system to mix local video, i.e., video captured by a client device, with composite conference video, i.e., video from a videoconference server presenting a mix of participant video, according to position and layout information provided by either the videoconference client or the videoconference server. As used herein, media includes any suitable type of information or data encountered within a videoconference environment, e.g., video/audio streams, raster/vector images, documents, annotations, POWERPOINT presentation images, etc. Embodiments of the present invention may be implemented in a multi-participant videoconference system. An exemplary multi-participant videoconference system is generally described below, and is further described in detail in U.S. patent application Ser. No. 10/192,080 filed on Jul. 10, 2002, and entitled "Multi-Participant Conference System With Controllable Content Delivery Using a Client Monitor Back-Channel" which is hereby incorporated by reference for all purposes.

Multi-Participant Videoconferencing System

As an overview, a general description of a multi-participant videoconferencing system in which embodiments of the present invention can be implemented is provided. The following description is intended to be exemplary of a multi-participant videoconferencing system and environment, and should not be construed as limiting or exclusive. Embodiments of the present invention can be implemented in a plurality of videoconferencing systems, and may serve to enhance or improve the videoconferencing experience with a system less capable or simply having different features than the exemplary system described.

An exemplary multi-participant videoconferencing system environment includes a server-side multi-point control unit (MCU) to enable multi-participant features while connecting clients having pre-existing peer-to-peer videoconferencing software. The multi-participant videoconferencing system includes a parallel connection to the conference channel to enable functionality through a client monitor that monitors a participant's interactions with the videoconferencing system.

The exemplary multi-participant videoconferencing system includes a client component and a server component. The client component includes a conference client and a client monitor. Generally, the conference client is a peer-to-peer videoconferencing application. An example of a peer-to-peer videoconferencing application is MICROSOFT'S™ NETMEETING® application, but many peer-to-peer videoconferencing applications exist and may be suitable according to a particular videoconferencing system. The client monitor captures input from the conference client. In addition, the client monitor may incorporate a graphical user interface (GUI) in which the video window of the peer-to-peer application is a component.

The client monitor provides the captured input from the conference client to the server component. The captured input is transmitted to the server component through a separate connection, i.e., a back-channel connection, that operates in parallel with the conference channel for each conference client. A back-channel connection system enables the server to dynamically modify the GUI being presented to a participant based on the captured input provided to the server component. For example, the client monitor can capture events, such as mouse clicks or other mouse and/or keyboard activity, executed by a user when the mouse pointer is within a region of the conference client that displays the video signal. The events are transmitted through the back-channel connection to the server component for interpretation. In this manner, the back-channel connection allows for active regions and user interface objects within the video stream to be used to effect functionality and content.

Figure 1:
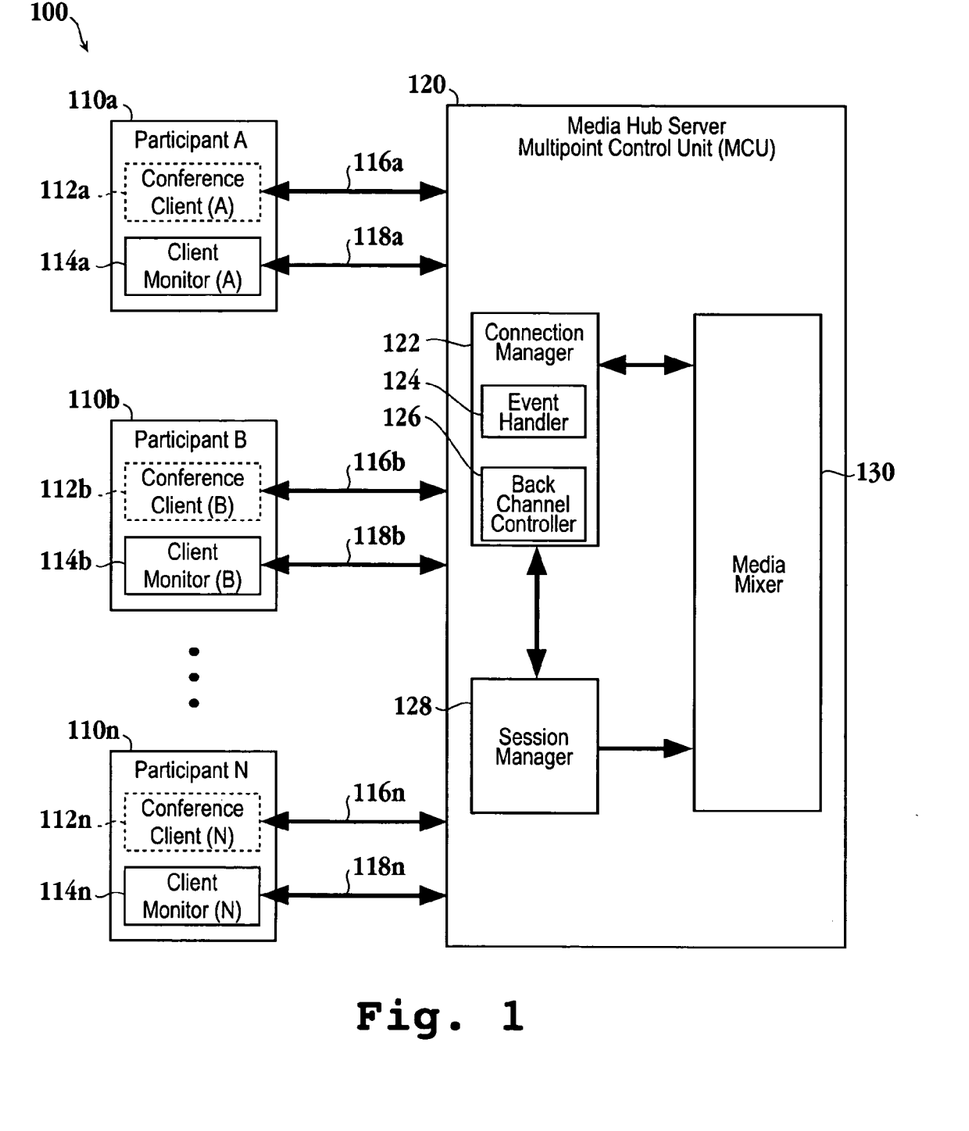
FIG. 1 is a schematic diagram of an exemplary multi-participant videoconference system using a client monitor back-channel suitable for embodiments of the present invention.

FIG. 1 is a schematic diagram of an exemplary multi-participant videoconference system 100 using a client monitor back-channel suitable for embodiments of the present invention. The exemplary multi-participant videoconference system 100 includes a client component and a server component. The client component of the multi-participant videoconference system 100 includes multiple participants 110, such as participant A 110a, participant B 110b, etc., through participant N 110n. Each participant 110 includes conference client 112 and client monitor 114. For example, participant A 110a includes conference client A 112a and client monitor A 114a. In one embodiment, conference client A 112a includes the participant's peer-to-peer videoconferencing software. The functionality of conference client A 112a generally includes placing calls to another participant 110, establishing and disconnecting a conferencing session, capturing and sending content, receiving and playing back the content exchanged, etc. It should be appreciated that calls from conference client A 112a route through media hub server multipoint control unit (MCU) 120, the server component of exemplary multi-participant videoconferencing system 100. Other participants similarly use their associated conference client to place calls to MCU 120 to join the conference. In one embodiment, conference client A 112a includes a high-level user-interface for the conference, such as when the conference client is a pre-existing software application. For example, one product that provides peer-to-peer videoconferencing is NETMEETING® from MICROSOFT™ Corporation.

Client monitor (CM) 114 monitors conference client 112. CM 114a is configured to monitor conference client A 112a. That is, CM 114a looks at how a participant 110 is interacting with the software application by monitoring, for example, a video display window of conference client A 112a. In addition, CM 114a interprets the participant's 110 interactions in order to transmit the interactions to the server component. In one embodiment, CM 114 is configured to provide four functions. One function monitors the start/stop of a conference channel so that a back-channel communication session can be established in parallel to a conference channel session between the participant and the server component. A second function monitors events, such as participant 110 interactions and mouse activity, within the video window displayed by conference client 112. A third function handles control message information between the CM 114 and a back-channel controller 126 located in the server component. A fourth function provides an external user-interface for the participant 110 that can be used to display and send images to other conference participants 110, show the other connected participant names, and other communication information or tools.

As mentioned above, client monitor 114 monitors activity in conference client 112. For example, this may include monitoring participant events over the video display region containing the conference content, and also may include the conference session control information. For example, CM 114 monitors the start and end of a conference session or a call from the conference client. When conference client 112 places a call to MCU 120 to start a new conference session, CM 114 also places a call to the MCU 120. The call from CM 114 establishes back-channel connection 118 for the participant's conference session. Since CM 114 can monitor the session start, stop, and other events, back-channel connection 118 initiates automatically without additional user setup, i.e., the back-channel connection 118 is transparent to a user. Accordingly, a new session is maintained in parallel with conference client 112 activity. It should be appreciated that conference channel 116 provides a video/audio connection between conference client 112 and connection manager 122 of MCU 120. In one embodiment, conference channel 116 provides a communication link for real time video/audio data of the conference session communicated between the client component and the server component.

In one embodiment, CM 114 specifically monitors activity that occurs over the conference's video frame displayed by conference client 112. For example, CM 114 may monitor the video image in MICROSOFT'S™ NETMEETING® application. Mouse activity in the client frame is relayed via protocol across back-channel connection 118 to MCU 120. In turn, back-channel controller 126 can report this activity to another participant, or event handler 124 for the respective participant. In this embodiment, the monitoring of conference client 112 application occurs through a hook between the operating system level and the application level. As described below, the video window can be monitored for mouse clicks or keyboard strokes from outside of the videoconferencing application.

In another embodiment, CM 114 can present a separate user-interface to the participant. This interface can be shown in parallel to the user interface presented by conference client 112 and may remain displayed throughout the established conference. Alternatively, the user interface presented by CM 114 may be presented before or after a conference session for other configuration or setup purposes.

In yet another embodiment, CM 114 may provide an interface for direct connection to a communication session hosted by MCU 120 without need for a conference client. In this embodiment, CM 114 presents a user interface that allows back-channel connection 118 to be utilized to return meeting summary content, current meeting status, participant information, shared data content, or even live conference audio. This might occur, for instance, if a participant has chosen not to use conference client 112 because the participant only wishes to monitor the activities of the communication.

CM 114a is configured to recognize when the videoconference application of conference client A 112a starts and stops running, in turn, CM 114a can start and stop running as the conference client does. CM 114a can also receive information from MCU 120 in parallel with the videoconference session. For example, CM 114a may allow participant A 110a to share an image during the conference session. Accordingly, the shared image may be provided to each of the client monitors so that each participant is enabled to view the image over a document viewer rather than through the video display region of the videoconference software. As a result, the participants can view a much clearer image of the shared document. In one embodiment, a document shared in a conference is available for viewing by each of the clients.

The server component includes MCU 120 which is configured to deliver participant customizable information. It should be appreciated that MCU 120 and the components thereof are software code configured to execute functionality as described herein. In one embodiment, MCU 120 is a component of a hardware based server implementing the various features described herein and elsewhere. MCU 120 includes media mixer 130, back-channel controller 126, and event handler 124. MCU 120 also provides connection manager 122 and session manager 128.

In one embodiment, MCU 120 functionality is enabled by providing for connections of separate participants into selectable logical rooms for shared conference communications. MCU 120 acts as a "peer" to a conference client, but can also receive calls from multiple participants. One skilled in the art will appreciate that MCU 120 internally links all the participants of the same logical room, defining a multi-participant conference session for each room. Each peer-to-peer conference client 112 operates with the MCU 120 only as a peer. Acting as a peer endpoint for each of participants 110, connection manager 122 is where all media enters and exits the MCU 120 for a given participant 110. Participants 110 equipped with a back-channel connection 118 connect with connection manager 122 for resolution of events, through the event handler 124. In one embodiment, MCU 120 is configured to conform to the peer requirements of conference client 112. For example, if the conference clients 112 are using H.323 compliant conference protocols, as found in applications like MICROSOFT'S™ NETMEETING®, MCU 120 must also support the H.323 protocol. The conference communication, in various embodiments of the exemplary multi-participant videoconference system 100 can occur via H.323 protocols, Session Initiated Protocols (SIP), or other suitable APIs that match the participant connection requirements. Conference communication by any protocols or APIs as described above is usually over conference channel 116.

Event handler 124 monitors each participant's 110 activity and provides input to the media mixer 130 to configure a media layout or presentation. Session Manager 128 defines the rules that govern each type of conference collaboration and controls both system and participant media exchange behaviors accordingly. Session manager 128 can limit the content available to participants 110 for their manipulation or control. Session manager 128 can also define the roles of a set of one or more participants 110 and offer functions appropriate to their roles. By way of example, session manager 128 may define presentation rules that favor control of a conference by a speaker participant 110 over audience participants 110. When an audience participant 110 has a question, the rules may dictate that the speaker participant 110 must signal the system to call upon the audience participant 110 with the question, allow the audio of the audience participant 110 to pass through the system, and then return control to the speaker participant 110 for comments. In defining panel discussion rules, session manager 128 may define a small set of participants 110 to constitute the "primary" participants 110, while other participants 110 attend in an essentially observation mode only. Session manager 128 functions include controlling content and activity based upon the collaboration model.

Media mixer 130 is configured to assemble audio and video information specific to each participant 110 from the combination of all participants' 110 audio and video, the specific participant 110 configuration information, and server user-interface settings. Media mixer 130 performs multiplexing work by combining incoming data streams, i.e., audio/video streams, on a per participant 110 basis. Media mixer 130 includes a video layout processor and an audio distribution processor to assemble the conference signals. Media mixer 130 receives instruction from a number of sources including event handler 124, and session manager 128, to control the layout and content of media delivery for each participant 110.

The client monitor-back-channel network allows MCU 120 to monitor a participant's interactions with conference client 112 and to provide the appearance that the peer-to-peer software application has additional functionality. The additional functionality adapts the peer-to-peer functionality of the software application, executed by conference client 112, for the multi-participant environment described herein. The client monitor back-channel network includes client monitor 114 back-channel connection 118, back-channel controller 126, and event handler 124.

Back-channel connection 118 is analogous to a parallel conference in addition to conference channel 116. Back-channel controller (BCC) 126 maintains the communication link from each client monitor. Protocols defined on the link are interpreted at MCU 120 and passed to the appropriate destinations, i.e., BCC 126 for other participants, event handler 124, or back to the CM 114.

In one embodiment, MCU 120 provides a client configurable video stream containing a scaled version of each of the conference participants. A participant's event handler 124 in MCU 120 is responsible for maintaining state information for each participant 110 and passing this information to media mixer 130 for construction of that participant's view of the conference provided over conference channel 116.

Local Video Loopback

Figure 2:
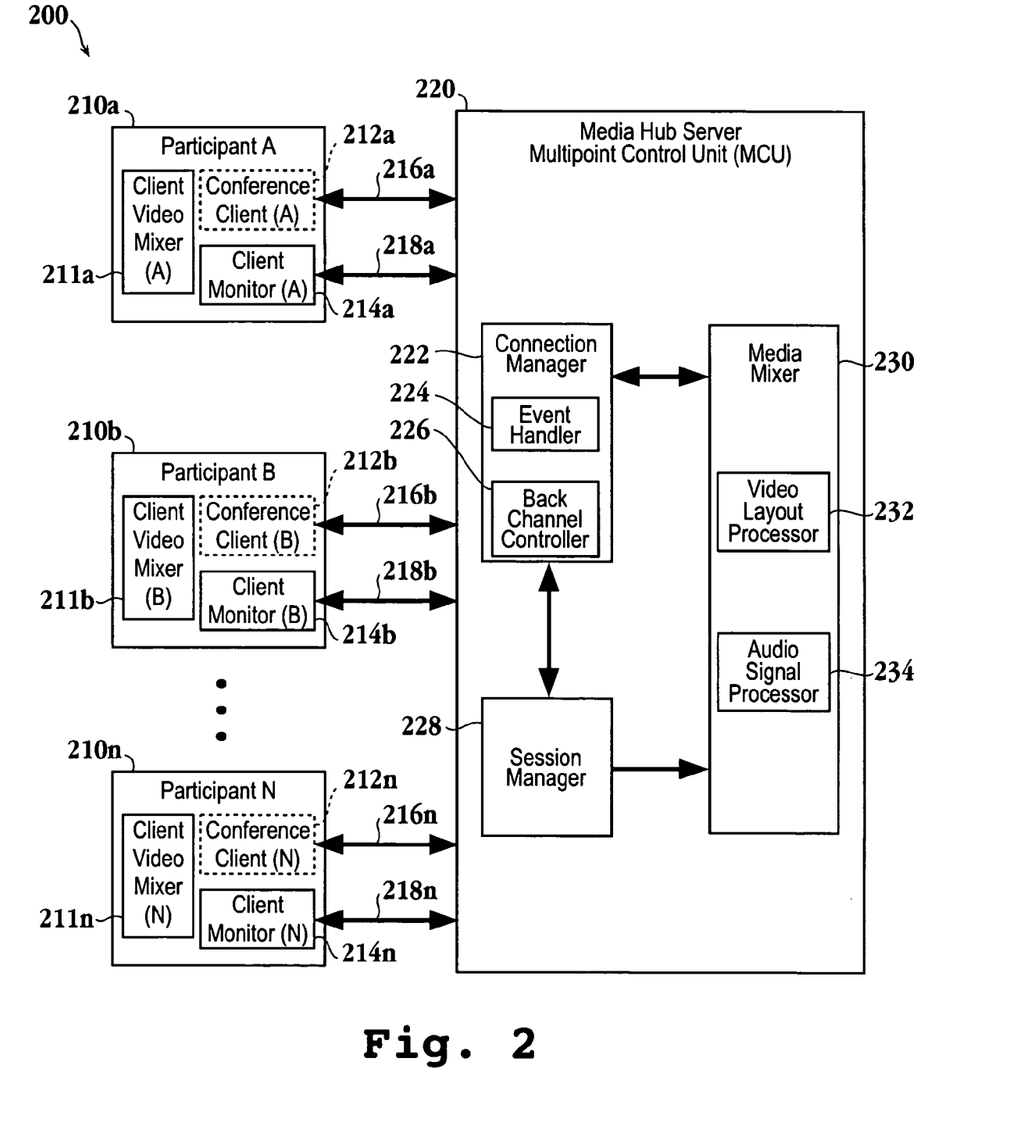
FIG. 2 shows a multi-participant video conference system implementing local video loopback in accordance with an embodiment of the present invention.

FIG. 2 shows a multi-participant video conference system 200 implementing local video loopback in accordance with an embodiment of the present invention. Multi-participant video conference system 200 includes a client side having a plurality of participants 210, illustrated by participants A, 210a, B 210b, through participant N, 210n. Each participant 210 includes a conference client 212, a client monitor 214, and a client video mixer 211, with the conference client for participant A 210a shown at 212a, the conference client for participant B 210b shown at 212b, etc.

In the multi-participant video conference system 200 shown in FIG. 2, each participant 210 on the client side is connected to the MCU 220 on the server side by a conference channel 216 and a back-channel 218, with conference channel A designated 216a, conference channel B designated 216b, etc., for each conference channel 216, and similar designations for each back-channel 218. The MCU 220 on the server side includes a connection manager 222. Connection manager 222 includes an event handler 224 and a back-channel controller 226. In one embodiment, the event handler 224 and the back-channel controller 226 provide individual event handling and back-channel control functionality for each participant. MCU 220 further includes a session manager 228 and a media mixer 230. Media mixer 230 includes a video layout processor 232 and an audio signal processor 234. The functionality of each of the identified components is as described above in reference to the exemplary multi-participant videoconference system 100 illustrated in FIG. 1. Additional components shown in FIG. 2 and their associated functionality is as described below in reference to various embodiments of the present invention. In general, multi-participant videoconference system 200 includes a client side enhancement of a client video mixer 211 for each participant 210 for the mixing of local video with a composite conference video signal for display by conference client 212, and the server side includes such enhancements as functionality to notify a client over backchannel 218 the position or location in the composite video signal delivered over conference channel 216 for mixing the local video.

Participants of the defined multi-participant videoconference system 200 receive a single video signal representing a view of the videoconference. Each participant's 210 view may be divided into regions in a video layout chosen by the participant 210 or by the conference system 200. Each region in the video layout is configured to present a media in the conference. For example, in a conference of five participants, a four region video layout may be selected by one of the participants. Each region is configured to show the video contributed to the collaboration by each of the other four participants. A second participant chooses a video layout with a single region and configures it to show the video of the primary speaker participant.

FIGS. 3A–3E illustrate exemplary media layouts implemented in one or more embodiments of the present invention. As used herein, a media layout defines a set of regions (R1–Rn) segmenting a view. A region that overlaps another may either "cut" away (hide) the space it overlaps or it may be transparently merged with the overlapped region. Each region represents a placeholder for containing some media content available in the multi-participant videoconference system 200 (see FIG. 2) for a particular collaboration or conference. As embodiments of the present invention describe video media, the description of a media layout generally describes a video layout, and the terms media layout and video layout are used interchangeably. In one embodiment of a video layout, for example, the video frames available from each conference participant 210 are scaled to fit within one or more of the Rn regions according to the viewing participant's unique configuration rules, with each Rn region containing one video frame.

In embodiments of the present invention, participants 210 (see FIG. 2) can select from a plurality of options in creating a desired video layout for display on the conference client 212. In other embodiments, multi-participant videoconference system 200 (see FIG. 2) assigns a video layout according to a plurality of criteria including, but not limited to, number of participants, rules of the collaboration, available resources, etc. In one embodiment a Server User-Interface (SUI) region is defined in the media layout. The SUI region is reserved for server interface or configuration interfaces.

Figure 3A:
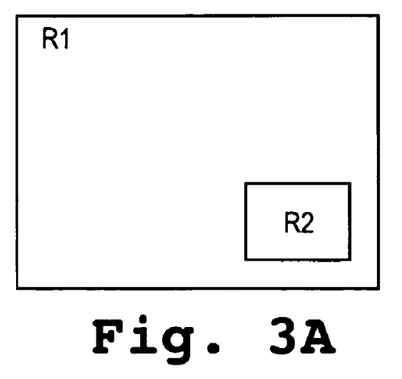
FIGS. 3A–3E illustrate exemplary media layouts implemented in one or more embodiments of the present invention.
Figure 3B:
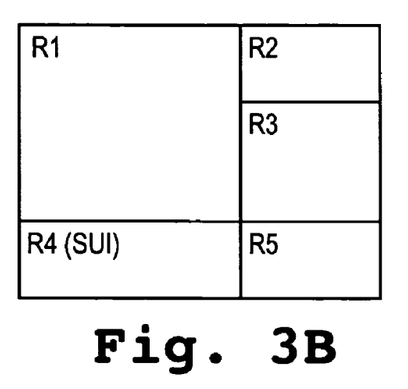
Figure 3C:
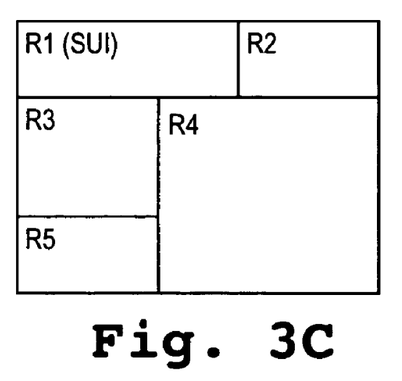
Figure 3D:
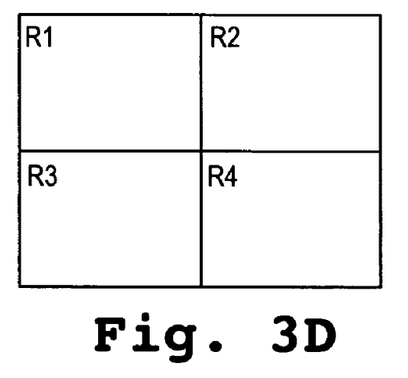
Figure 3E:
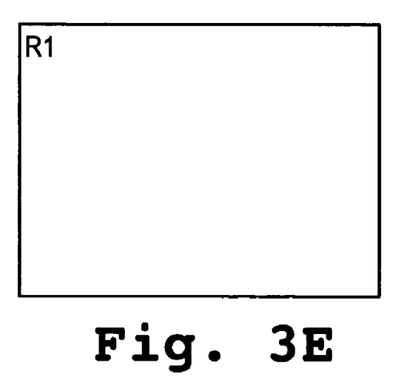

FIGS. 3A–3E illustrate a variety of exemplary media layouts available in embodiments of the present invention. In FIG. 3A, a primary region, R1 essentially fills the media layout, and a single region of secondary importance, R2, is identified in a smaller, "picture-in-picture" display. In FIG. 3B, a primary region R1 is the largest region on the left of the media layout with an SUI in a smaller region immediately below the primary region R1. Each Rn (i.e., R1, R2, R3, R4, R5) in FIGS. 3A–3E identify discrete video or other media display regions. FIG. 3C shows another multiple sized Rn configuration, and FIG. 3D shows multiple Rn regions of equal size. FIG. 3E illustrates a single region R1 filling the media layout. Any number of suitable layouts can be designed for video layouts, and FIGS. 3A–3E do not represent all possible layout options available.

It is often advantageous for a participant 210 (see FIG. 2) of a video conference to have a view of the video that the participant him or herself is providing to the collaboration. By way of example, the primary speaker in a presentation may desire to ensure proper framing, presentation and visibility of visual aids, or even self evaluation of the presentation, etc. In one embodiment of the present invention, any of the regions Rn shown in FIGS. 3A–3B, except for the SUI region, may be selected to be a self video region.

Typically, to enable the self video as a region of the video layout, video is sent from the participant's conference client 212 (see FIG. 2) to the MCU 220 across the conference channel 216. The MCU 220 includes media mixer 230 with video layout processor 232. For each participant 210, the video layout processor 232 combines the conference video signals from a multitude of contributing participants 210 into a composite video signal according to the participant's 210 video layout and region configuration settings and selections. In one embodiment, each participant 210 may have individual video layout selections. By way of example, participant A 210a may choose a video layout similar to FIG. 3A, while participant B 210b may choose a video layout similar to FIG. 3D, etc., according to individual preferences and other criteria. A resulting composite video signal is returned to the participant's 210 conference client 212 across the conference channel 216.

Although a participant 210 could see the local video in this view along with other participants' 210 video in the other video layout regions, as described above, the process introduces latency through transmission delays and processing time, and the video quality can be reduced as the video signal may be operated on by encoders, decoders, mixers, processors, and affected by transmission limitations including bandwidth or signal loss. Local video viewed in this manner will be degraded, and the reality of the not-so-real-time aspects of the communication system will be more noticeable.

In one embodiment of the present invention, a videoconference system 200 (see FIG. 2) is provided having a local video loopback to enhance the videoconference environment for both the participant 210 implementing the local video loopback, as well as the other participants 210 in the videoconference.

Turning back to FIG. 2, embodiments of the present invention include a client component with one or more participants 210 having a conference client 212 and a client video mixer 211 in communication with a client monitor. In other words, each participant includes a conference client 212 and a client monitor 214, and an optional client video mixer 211. The client monitor 214 is configured to monitor activity of the conference client 212 that occurs over a video frame displayed by the conference client 212. The client video mixer 211, in one embodiment, receives the video conference media prior to display by the conference client 212, and further receives real-time captured local video before it is transmitted to the MCU 220 by the conference client 212 over conference channel 216. In one embodiment, the video loopback method of this invention can be enabled only for participants 210 that include or can be configured with the optional client video mixer 211.

As described above, the MCU 220 includes a media mixer 230 that is configured to assemble audio and video data to be supplied to each conference client 212 from audio and video data received by the media mixer 230 from a plurality of conference clients 212. The media mixer 230 includes a video layout processor 232 configured to generate a composite video image for each of the plurality of conference clients 212. The media mixer 230 also includes an audio distribution processor, also known as an audio signal processor 234, for providing an audio signal for each of the plurality of conference clients 212. MCU 220 includes a connection manager 222 allowing connections of several participants 210 into logical rooms for shared conference communications. The connection manager 222 includes a back-channel controller 226 enabling communication between the client monitor 214 and the MCU 220. The connection manager 222 also includes an event handler 224 configured to insert interface data into an outbound video stream image through the video layout processor.

Embodiments of the present invention define a client component of the multi-participant videoconference system 200 that contains a client video mixer 211. In one embodiment, client video mixer 211 provides the video signal for display by the client component. Inputs to the client video mixer 211 include the local video from the participant's 210 capture device, video from conference channel 216, and notification/position events from client monitor 214.

In one embodiment of the present invention, client monitor 214 notifies MCU 220 across back-channel 218 if a client video mixer 211 is available as part of the client component for a given participant 210. This notification informs the video layout processor 232 within media mixer 230 of the availability of a local video loopback feature within the client component for the given participant 210. In one embodiment, the client informs the server that the client is configured with a client video mixer 211 when the client joins the multi-participant videoconference, for example. In one embodiment, the server requests the information from the client. In one embodiment, notification may be sent to enable or to disable the local video loopback feature for a specific participant 210.

In one embodiment of the invention, the client monitor 214 measures activity over a video frame of the conference client 212 and reports events to the MCU 220 across back-channel 218. The events are relayed to media mixer 230. Events are translated into commands, or server defined actions, and interpreted by the modules within the server component. The video layout processor 232 monitors commands for each client component regarding selection of a video layout and the requested video requirement for each video region within the layout.

A region of a participant's 210 video layout that is configured or identified to contain the local video of the same participant 210 is called a local video region. If a local video region is defined, and the video layout processor 232 has been notified to enable the local video loopback feature for the participant 210, the video layout processor 232 signals the participant's 210 client component through the back-channel communication link 218 with a set of position information. In one embodiment, the position information includes the coordinates (x, y) and the size (width, height) of the local video region within the view of the composite video signal sent from the MCU 220 to the client component across conference channel 216. In other embodiments, position and size information is provided to participant 210 in any manner compatible with and capable of being understood by client and server components of multi-participant video conference system 200. In one embodiment, if the identified local video region is obscured by other regions in the video layout, then the set of position and size information includes the coordinates and size of each overlapping media.

The client monitor 214 receives the position and size information, and then relays the position and size information to the client video mixer 211. The client video mixer 211 combines incoming video for conference client 212 from conference channel 216 with the participant's 210 local video before display on the conference client 212. The position and size information describes an area of the incoming composite conference video to replace with local video in a mixing operation. The resulting video signal is then displayed on the conference client 212.

In one embodiment of the present invention, the server exercises primary control over the local video loopback process and technique. As described in greater detail below, the server manages performance, quality, etc., of the video processing by controlling codec efficiencies, bitrate, etc. The server defines the video layout, whether or not a participant 210 requests a specific layout, and the server defines the region, the location and the size, where the participant local video is to be presented. The server defines the region for local video, provides the coordinates and size of the region to the client monitor 214 over the back-channel 218, and prepares the conference composite video having an identified region for the local video loopback when the feature is available and enabled. In response to the dynamics of a typical videoconference, as video regions change, so does the identified local video region, and the server informs the client monitor 214 of any change.

In one embodiment of the present invention, as changes to a participant's 210 video layout affect the local video region (either by being obscured by other regions, changing location or size, etc.), the video layout processor 232 signals the client monitor 214 with a new set of position information. The client video mixer 211 can make adjustments to the conference video accordingly. If a local video region is no longer configured within a participant's 210 video layout, the video layout processor 232 signals the participant's 210 client component with empty position information (i.e., coordinates and size null or zero). The client video mixer 211 can stop combining local video and pass the conference video to the display unchanged.

Through back-channel notification, the video layout processor 232 is notified that the client component is enabled to replace known regions of the conference video with the participant's 210 local video using a mixing method of the client video mixer 211. As a result, the local video region within the video layout of the composite conference video may define a place holder for the local video. In one embodiment, video layout processor 232 provides client monitor 214 the position and size information over back channel 218 at the time the local video loopback feature is activated, at a time when the video layout changes (i.e., the size of the region changes, the position of the region changes, overlapping regions change, etc.) during the period of activation, and when the local video loopback feature is disabled. In other words, the information is not provided continuously with each video frame delivered while enabled.

Figure 4:
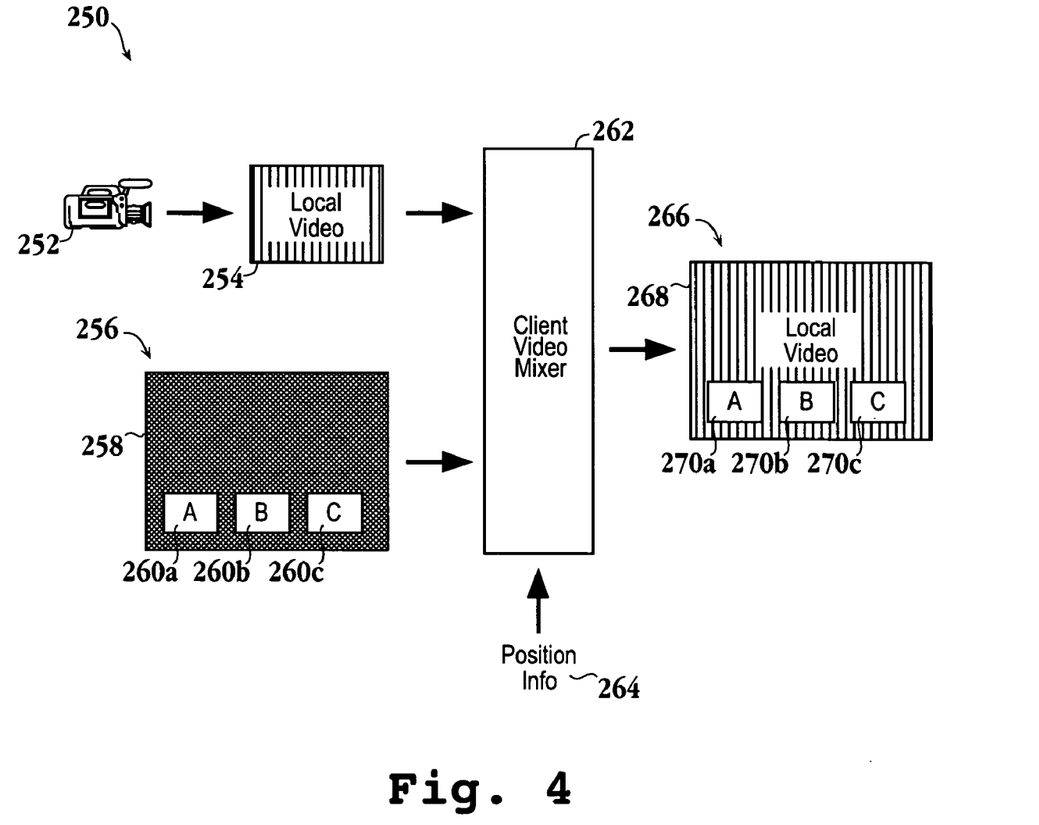
FIG. 4 is a system schematic of local video mixing by a client component in accordance with one embodiment of the present invention.

FIG. 4 is a system schematic 250 of local video mixing by a participant 210 (see FIG. 2) in accordance with one embodiment of the present invention. As described above, a client video capture device 252 captures local video 254 and forwards the video signal to the client video mixer 262. Conference composite video 256, also referred to as the conference video signal, for the particular participant 210 is generated by video layout processor 232 (see FIG. 2) in the media mixer 230 (see FIG. 2) of the MCU 220 (see FIG. 2). In the illustrated conference composite video 256, region 258 is a region identified for local video. In accordance with one embodiment of the invention, no content is created for the region 258 designated for local video. The definition of this null or empty area may differ according to the protocol and codec system used, however no scaling, or other processing is performed for the identified region 258. In various embodiments, the local video region 258 is identified in the composite video 256 and painted all black, all gray, with a single, unchanging frame of video, such as the last frame of video prior to implementing local video loopback, or even with the local video received from the particular participant 210 with the "knowledge" that the region will be replaced with local video loopback.

Remaining conference video is defined in areas 260 (260a, 260b, 260c). In accordance with an embodiment of the invention, local video region 258 is essentially the entire area of the video display for the selected layout. Conference video areas 260 overlie and obscure regions of the local video, region 258. Position and size information describing the conference video areas 260 will identify the local video region 258 and a set of coordinates and a size for each overlapping region 260.

In addition to local video signal 254 and conference composite video 256, position and size information 264 is provided to client video mixer 262. Position and size information, in one embodiment, includes the coordinates and the size of the local video, region 258, within the view of the conference composite video 256. Since, in system schematic 250, local video, region 258, is obscured by conference video areas 260, the coordinates and size of each area 260 are also provided. In other embodiments, the coordinates and size of the local video region are sufficient to identify the local video region, as illustrated in FIGS. 5A–5D.

Resulting video 266 includes local video 268 and conference video areas 270 (270a, 270b, 270c) in an integrated video display. The resulting video 266 is displayed on conference client 212, and provides the quality and near-real-time features of local video, integrated with the composite conference video for an enhanced multi-participant videoconference environment.

Figure 5A:
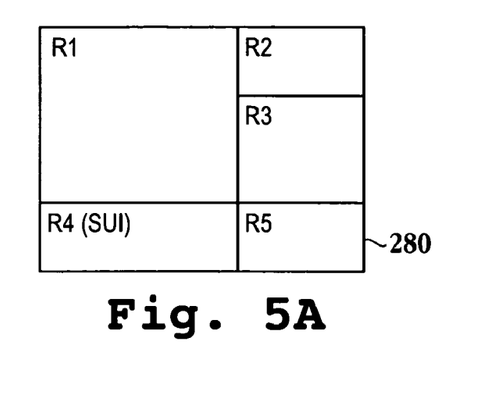
FIGS. 5A–5D illustrate exemplary video layouts and resulting integration of local video in accordance with one embodiment of the present invention.
Figure 5B:
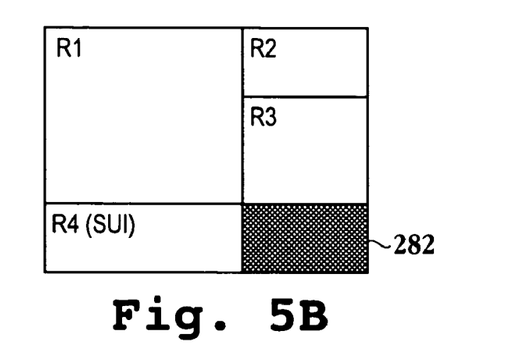

FIGS. 5A–5D illustrate exemplary video layouts and resulting composite layouts for the integration of local video in accordance with one embodiment of the present invention. In FIG. 5A, a selected video layout includes four regions (R1, R2, R3, and R5) defined for conference video, and a fifth region R4 defined as a server user-interface. In the exemplary video layout illustrated in FIG. 5A, region R5 280 has been designated for local video. FIG. 5B shows the resulting composite conference video as constructed by the video layout processor 232 (see FIG. 2) and transmitted to a participant 210 (see FIG. 2) across conference channel 216 (see FIG. 2). In FIG. 5B, local video region 282 is represented as a null or empty region, painted all black, in the composite video layout. In one embodiment of the invention, video layout processor 232 transmits to participant 210 position information including the coordinates (x, y) and the size (width, height) of the local video region across back-channel 218 (see FIG. 2). The transmitted composite video signal includes the composite video signals of the selected participants in each of the other regions as selected by the participant 210, and null or empty region for the identified local video region 282. In one embodiment, as described above, the client video mixer 211 (see FIG. 2) combines the composite video signal such as that illustrated in FIG. 5B, and the participant 210 local video before display on the conference client 212 (see FIG. 2).

Figure 5C:
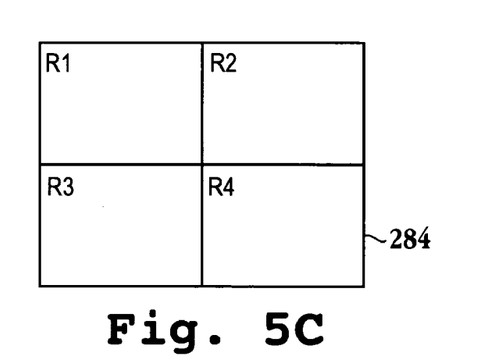
Figure 5D:
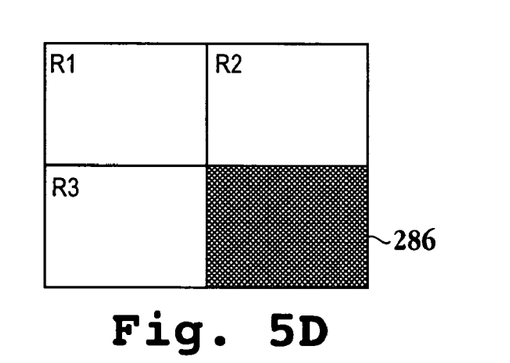

FIGS. 5C and 5D illustrate another example of a video layout in accordance with another embodiment of the invention. In FIG. 5C, a video layout as might be selected by a participant 210 (see FIG. 2) is shown. The exemplary layout includes four regions for video display. Region R4 284 has been identified, or selected by a participant 210, to contain local video. In FIG. 5D, the conference composite video as would be transmitted to a participant 210 (see FIG. 2) across conference channel 216 (see FIG. 2). Null or empty region 286 is identified for local video, and the coordinates and size of the null or empty region 286 are transmitted to participant 210 across back-channel 216 (see FIG. 2). The composite video layout as shown in FIG. 5D is then combined with the participant's 210 local video in the client video mixer 211 (see FIG. 2) for display on conference client 212 (see FIG. 2).

In one embodiment of the present invention, content for the local video region in the composite video signal for the participant 210 (see FIG. 2) is not created by the video layout processor 232 (see FIG. 2), as anything defined for the region will not be displayed. The video layout processor 232 will therefore not expend resources to place video into the region only to have the video data replaced by the client video mixer 211 (see FIG. 2). Instead, the region is emptied by video layout processor 232. The definition of empty may differ according to various encoding techniques employed. However, in most videoconference systems utilizing H.263, H.261, or other video codecs, non-changing frame data can improve codec performance. In one embodiment of the invention, video is not scaled or otherwise manipulated for the local video region and by not scaling video into the local video region or performing other related processing over the region, the server performance can be increased.

In one embodiment, codec efficiencies are gained by implementing the present invention. By way of example, MCU 220 (see FIG. 2), can manage performance, quality, etc., as MCU 220 can control codec efficiencies, bitrate, etc. MCU 220 defines the composite conference video layout, with or without participant requests for specific video layouts, and identifies a region defined for local video. In preparing the conference composite video, MCU 220 can place or paint anything into the defined local video region. For example, MCU 220 may mix the received local video from the particular participant 210, even though the lower quality region will be replaced with local video by client video mixer 211. MCU 220 may also mix nothing into the defined local video region. Mixing "nothing" may include empty or null data, painting the region with all black or all gray, etc. MCU 220 may also paint the defined local video region with some alternate, static data, or, for example, the last frame of the video received before activating the local video loopback. Codec efficiency is gained because one less video stream is processed for the composite conference video, thereby saving CPU cycles for scaling, updating, etc. Further, H.263 or H.261 codecs, for example, operate on changes between frames. Since the stable black, gray, or other static data region, or the region of empty or null data, remains unchanged across frames, encoded bits will be dedicated to the other, changing, composite frame data and thereby automatically improving quality. MCU 220 may be configured to inform codecs of the non-changing, static, region so that CPU cycles are not wasted when the codecs scan these known, stable regions of the video for frame to frame changes. In one embodiment, depending on the size of the identified local video region, MCU 220 may lower the codec bitrate since fewer bits are changing in the composite frame. The lowering of the bitrate under these conditions serves to maintain the same level of visual quality in the changing video regions which improving the transport requirements of the data over conference channel 216.

Figure 6:
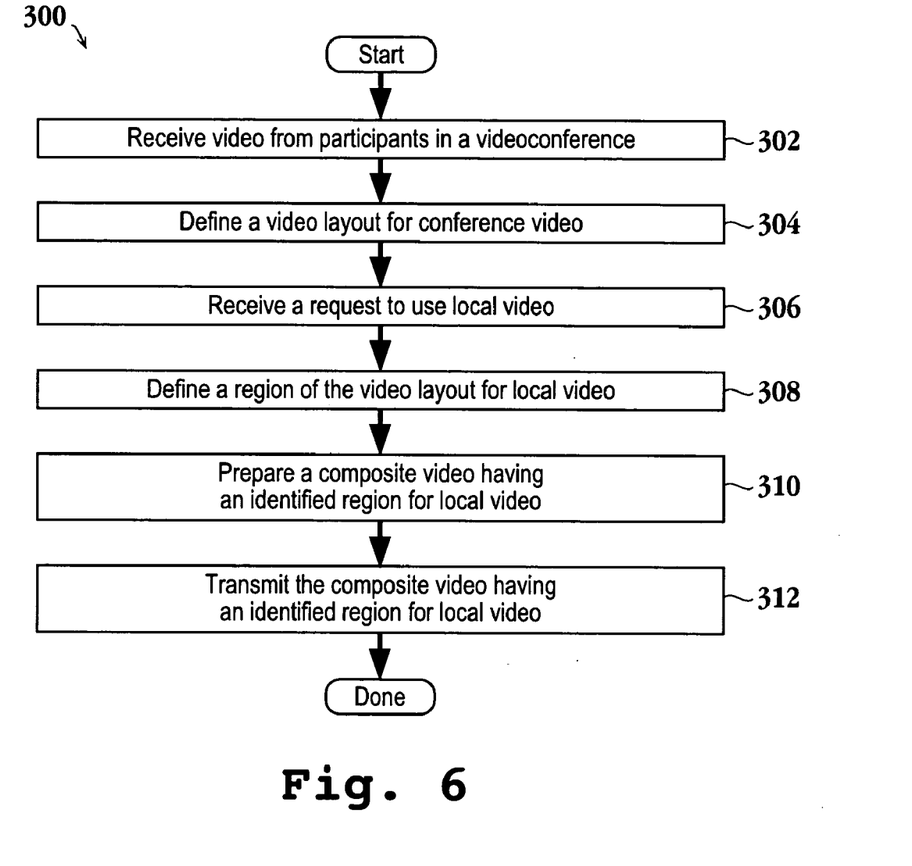
FIG. 6 is a flow chart diagram illustrating the method operations performed by the server side of a multi-participant videoconference system implementing local video loopback in accordance with one embodiment of the present invention.

FIG. 6 is a flow chart diagram 300 illustrating the method operations performed by the server side of a multi-participant videoconference system implementing local video loopback in accordance with one embodiment of the present invention. In accordance with embodiments of the present invention, an exemplary multi-participant videoconference system is as illustrated and described above in reference to FIG. 2. The method begins with operation 302 in which video is received from participants in the multi-participant videoconference system. In one embodiment, one or more participants provide a video feed or signal locally captured by each participant desiring and capable of providing video to the videoconference. The video is transmitted across a conference channel from a client side of the multi-participant videoconference system to the server side of the multi-participant videoconference system.

The method continues with operation 304 in which a video layout is defined for conference video. In one embodiment, each participant selects a desired video layout, including content for each of the defined regions in the selected video layout. In one embodiment, the multi-participant videoconference system provides a participant with a selection of video layouts from which to choose. In one embodiment, the multi-participant videoconference system dictates a video layout that will be provided to each participant. In operation 304 the video layout is defined for each participant, whether or not all participant video layout is identical, and however the video layout is chosen.

Next, in operation 306, the server side of the multi-participant videoconference system receives a request from one or more participants to use local video. In one embodiment of the invention, a participant desiring to use local video loopback must have a local, client video mixer. In requesting local video loopback, the participant informs the server of the capability to mix local video into the composite conference video supplied by the server.

The method continues with operation 308 in which a region is identified in the defined video layout for the local video. In one embodiment, the server defines the region in response to client selection. By way of example, client may select a video layout with a desired content for each region in the layout including a region for local video. The server defines the region by, for example, identifying a position and size of a region for local video within the composite conference video. The region may be a discrete, singular region of the composite conference video, or the region may be a cut-away or overlapping region with composite conference video regions obscuring portions of the local video region, or with composite conference video regions being obscured by portions of the local region. In one embodiment, the server defines and identifies regions of the composite conference video including a region for local video loopback without client input. In operation 308, the region for local video loopback is defined within the composite conference video. In one embodiment, the position and size of the defined region is provided by the server to the client over the back-channel.

In operation 310, the server prepares a composite conference video to be supplied to the participant. In one embodiment, the composite conference video is prepared by a video layout processor of the media mixer in the server side of the multi-participant videoconference system. The composite video includes an identified region for local video. In other words, the region of the video layout for local video that was defined in operation 308 is prepared or constructed in the composite video as an area or region of null or empty data, in one embodiment. In one embodiment, the identified region is painted all black, all gray, or some color pattern. In one embodiment, the identified region is painted with a static, stable image such as the last image of video received prior to activating local video loopback, or painted with some other alternative stable data.

The method concludes with operation 312 in which the composite video is transmitted to the participant for mixing and display. The composite video includes the region of null or empty data, or painted all black, all gray, or with some static, stable data, that will contain the locally mixed video by the participant. In one embodiment, the coordinates and size of the identified region are transmitted to the participant over a back-channel connection. In the case of a video layout in which the region identified for local video has overlapping regions of composite conference video, the coordinates and size of each overlapping conference video region is transmitted to the participant across the back-channel connection in addition to the coordinates and size of the local video region. Upon transmission of the composite conference video, the method is done. The method operations performed by the client side of the multi-participant videoconference system are described below in reference to FIG. 7.

Figure 7:
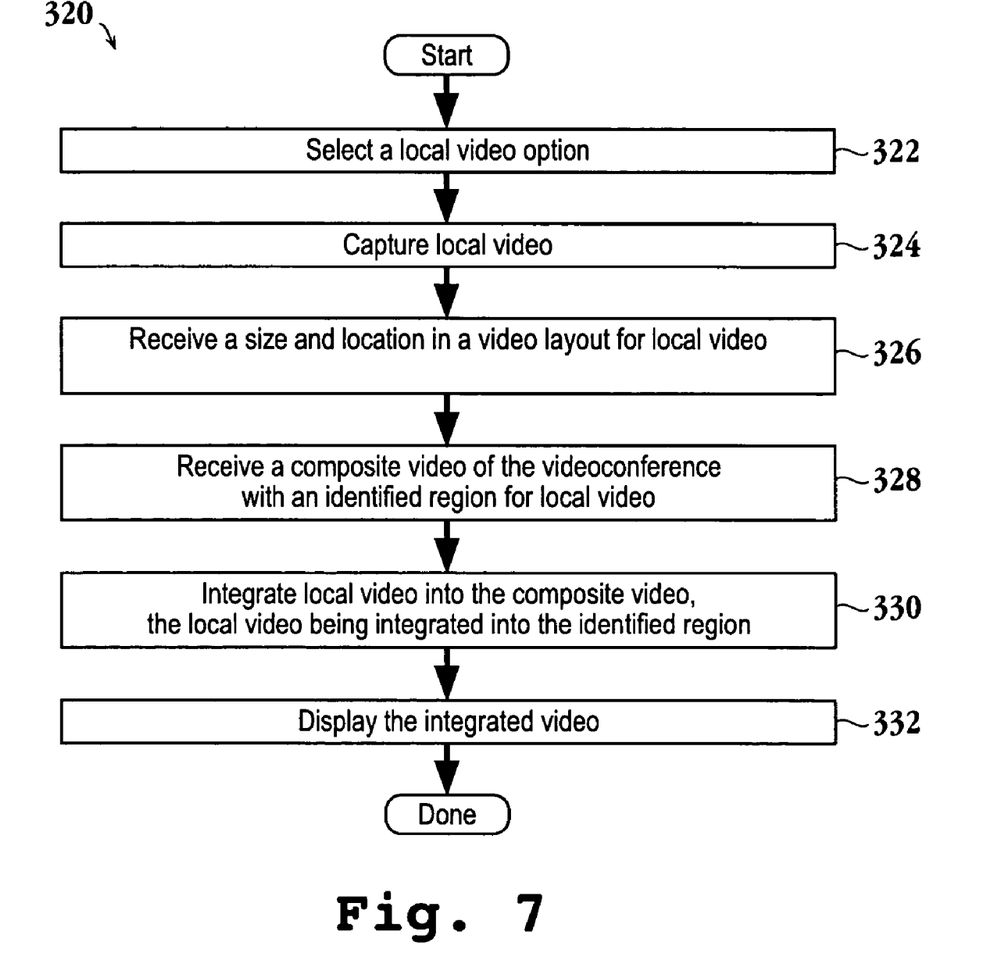
FIG. 7 is a flow chart diagram illustrating the method operations performed by a client in a multi-participant videoconference system implementing local video loopback in accordance with one embodiment of the present invention.

FIG. 7 is a flow chart diagram 320 illustrating the method operations performed by a client in a multi-participant videoconference system implementing local video loopback in accordance with one embodiment of the present invention. In accordance with embodiments of the present invention, an exemplary multi-participant videoconference system is as illustrated and described above in reference to FIG. 2. On the client side, local video is integrated with the composite conference video in a local client video mixer, and displayed on a graphical user interface of the conference client.

In FIG. 7, the method begins with operation 322 in which the participant selects a local video option. In one embodiment of the invention, each contributing participant contributes some video or other media to the multi-participant videoconference. When a participant desires to monitor or view the locally captured video near-real-time, without inherent latency from transmission delays, encoding, decoding, scaling, etc., the participant configures the local client and/or selects a conference option to view local video. In one embodiment of the present invention, local video loopback is an available option if the client has a local client video mixer. A local client video mixer enables the client to integrate locally captured video directly into the conference composite video received from the server. The client continues to transmit video to the server for integration into the conference composite video signal. The client further provides local configuration information to the server, including the presence of a local client video mixer. In one embodiment, when selecting a video layout for conference client display, a participant selects and identifies a desired region for local video. The participant, having selected a region for local or self video, and being appropriately configured and providing the configuration information to the server, "selects" a local video loopback option. In one embodiment, the participant has control over whether local video loopback is implemented. Participant chooses a layout, identifies a region for local video, and selects local video loopback to enable the local video loopback features and processing. In one embodiment, the server has control over whether local video loopback is implemented. If a participant defines a local video region in a video layout, and if the client component includes a client video mixer, the local video loopback process and features are automatically implemented by the server.

The method proceeds with operation 324 in which local video is captured by the participant. In one embodiment, the capturing of local video by a participant, and the forwarding of the captured video to the server is usual practice for a contributing participant of a multi-participant videoconference. In operation 324, video is captured according to usual practice, and the locally captured video is transmitted to both the local client video mixer and to the server for integration into the composite conference video.

In operation 326, the participant receives a size and location in a video layout for local video. In one embodiment, the size and location information is received by the client component over the back-channel. Size and location information defines a region of the composite conference video for local video. In one embodiment, the size and location information is received as a set of coordinates (x, y) defining the location, and a dimension (width, height) defining the size. In one embodiment, if the region defined for local video obscures, or is obscured by any other region defined in the composite conference video, the size and location of the affected region are also received. In one embodiment, the size and location information is used by the client video mixer to mix local video loopback into the composite conference video.

The method continues with operation 328 in which a composite video of the multi-participant videoconference, prepared by the server in the media mixer, is received by the participant across the conference channel. The client, being appropriately configured for local video loopback and having selected a local video loopback option, receives a composite conference video signal from the server with an identified region for local video from the local video loopback. In one embodiment, the identified region is painted with null or empty data. In one embodiment, the identified region is painted all black, or all gray, etc. In one embodiment, the identified region contains the same local video that was transmitted to the server, processed, and will be ultimately replaced by the participant local video processed in the client video mixer. In one embodiment, a single frame of the local video, or some other video, is painted in the identified region, eliminating frame changes and which will be replace by participant local video processed in the client video mixer.

Next, in operation 330, the local video is integrated into the composite conference video by the client. In one embodiment, the client receives a local video signal into the client video mixer, and receives a composite conference video into the client video mixer. The composite conference video for the particular client includes a region identified in some manner such as by null or empty data, painted all black or all gray, etc., defined for the local video using coordinate and size information delivered by the server across the back-channel. In operation 328, the local video is integrated into the composite conference video using the coordinate and size information, and any applicable overlapping coordinate and size information, delivered by the server into the region identified for local video in the client video mixer.

The method concludes with operation 332 in which the video, incorporating the local video in the region so defined, is displayed by the conference client. Upon display of the integrated video, the method is done.

In summary, the above described invention provides a multi-participant videoconference system having a back-channel network, and implementing a method for local video loopback. The system provides for preparing and transmitting, by the server to the client, composite conference video with a region defined for local video, the region being defined by empty or null data. The client then mixes local video into the composite conference video using a client video mixer. The local video is integrated into the defined region, providing the client an option to define the overall composite conference video that client will monitor, and using local video in place of conference composite video, overcoming the inherent delays of transmission, encoding, decoding, scaling, etc. Further, server performance is increased and codec efficiency is gained due to decreasing the demand for resources and more efficient utilization of bandwidth by defining a region of null or empty data in the composite conference video signal. A more efficient allocation of finite resources results, along with correspondingly improved quality, frame rate, etc.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A multi-participant videoconference system, comprising:
 a client component including a conference client that is enabled to execute videoconferencing software;
 a conference channel;
 a back-channel;
 a server component enabled to provide a composite video signal to the client component over the conference channel, the composite video signal containing a video signal received from at least one other client component in the multi-participant video conference system; and
 wherein the client component further comprises a client video mixer configured to mix a local video signal into the composite video signal received from the server component and render video images including a local video image contained in the composite video signal according to position and layout information communicated between the server component and the client component over the back-channel.

2. The multi-participant videoconference system of claim 1, wherein the position and layout information is transmitted to the client component from the server component.

3. The multi-participant videoconference system of claim 1, wherein the client component further includes a client monitor configured to monitor the conference client, and communicate client monitoring information to the server component through the back-channel, wherein the client monitor reports a region for local video to the server component based on the client monitoring information and receives the position and layout information from the server component through the back-channel.

4. The multi-participant videoconference system of claim 1, wherein the client component has associated with it a video capture device to capture the local video, generate the local video signal, and transmit the local video signal to the server component.

5. The multi-participant videoconference system of claim 1, wherein the server component is configured to define a display region for the local video relative to one or more display regions for the video in the composite video signal, and communicate the defined display region for the local video to the client component over the back-channel connection.

6. A method for defining a region for local video within a conference video layout on a display of a client in a multi-participant videoconference system, which also includes a server, the method comprising the steps of:
defining a conference video layout for the client's display, the conference video layout having a plurality of regions, at least one of which is for externally captured video carried in a composite conference video signal received from the server;
identifying a region in the defined conference video layout for display of local video that is captured by the client and processed only by the client;
communicating a size and a location of the identified region for display of the local video to the client;
transmitting the composite conference video signal to the client, the composite conference video signal including the identified region for display of the local video; and
mixing a local video signal containing the local video into the composite conference video signal in accordance with the identified region.

7. The method of claim 6, further comprising the step of:
communicating a size and a location of any of the at least one region for externally captured video that at least partially obscures the identified region for display of the local video to the client.

8. The method of claim 6, wherein, in the communicating step, the size and the location of the identified region for display of the local video are communicated through a back-channel of the multi-participant videoconference system.

9. The method of claim 6, wherein, in the transmitting step, the composite conference video signal is transmitted through a conference channel of the multi-participant videoconference system.

10. The method of claim 6, wherein the identified region for display of the local video in the composite conference video signal is painted one of all black, all gray, or with a static video image.

11. The method of claim 6, wherein the identified region for display of the local video in the composite conference video signal is identified according to a conferencing protocol of the multi-participant videoconference system.

12. The method of claim 6, wherein, in the identifying step, the region in the defined composite conference video layout identified for display of the local video is identified according to a selection of the client.

13. The method of claim 6, wherein the identifying step is carried out by the server.

14. A client component for use in a multi-participant videoconference system, the client component comprising:
a video capture device configured to capture local video and generate a local video signal;
a conference channel port through which the client component is configured to communicate primary conference information with an external component, the primary conference information including a composite video signal transmitted to the client component from the external component;
a back-channel port through which the client component is configured to communicate secondary conference information with the external component, the secondary conference information including instructions received by the client component from the external component regarding placement of the local video relative to the composite video on a display associated with the client component; and
a mixer configured to mix the local video signal into the composite video according to the received instructions.

15. The client component of claim 14, wherein the instructions comprise a specified region for the local video relative to the composite video.

16. The client component of claim 14, wherein the client component is configured to transmit a configuration status to the external component through the back-channel port.

17. The client component of claim 15, wherein the specified region is painted one of all black, all gray, or with a single static video image.

18. The client component of claim 15, wherein the specified region is specified according to a codec protocol.

19. A method for improving image quality of a composite conference video in a multi-participant videoconference system, comprising:
defining a layout for a plurality of video images;
identifying a region of the layout to be replaced by a locally generated video image;
composing a composite conference video signal configured to communicate and display the composite conference video in the defined layout, the composite conference video signal including the identified region;
transmitting the composite conference video signal from a server component to a client component of the multi-participant videoconference system; and
displaying the composite conference video with the identified region replaced by the locally generated video image.

20. The method of claim 19, wherein the identified region of the composite conference video signal is painted one of all black, all gray, or with a static video image.

21. The method of claim 19, wherein the identified region of the composite conference video signal contains null data.

* * * * *